Patented Mar. 22, 1932

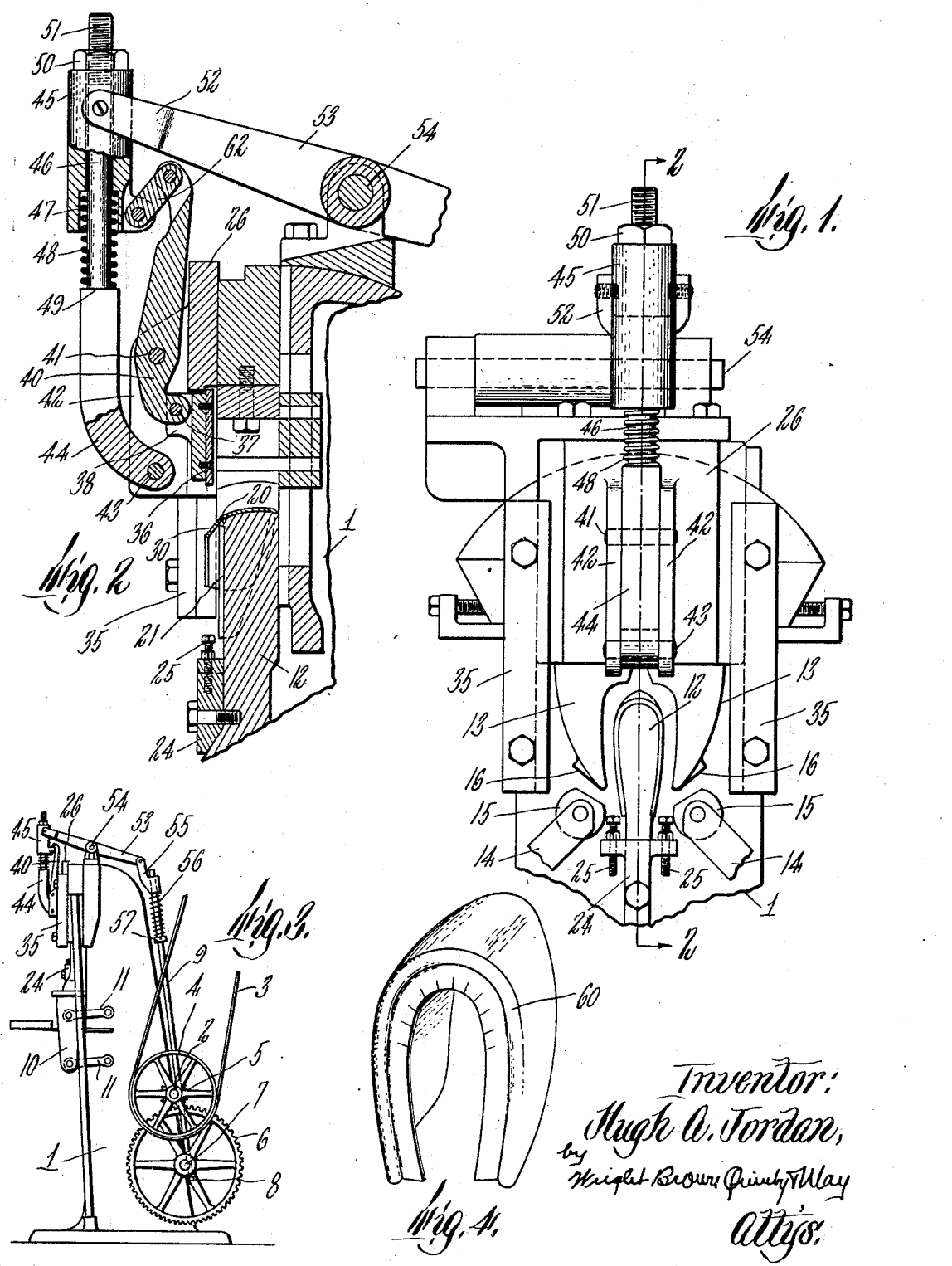

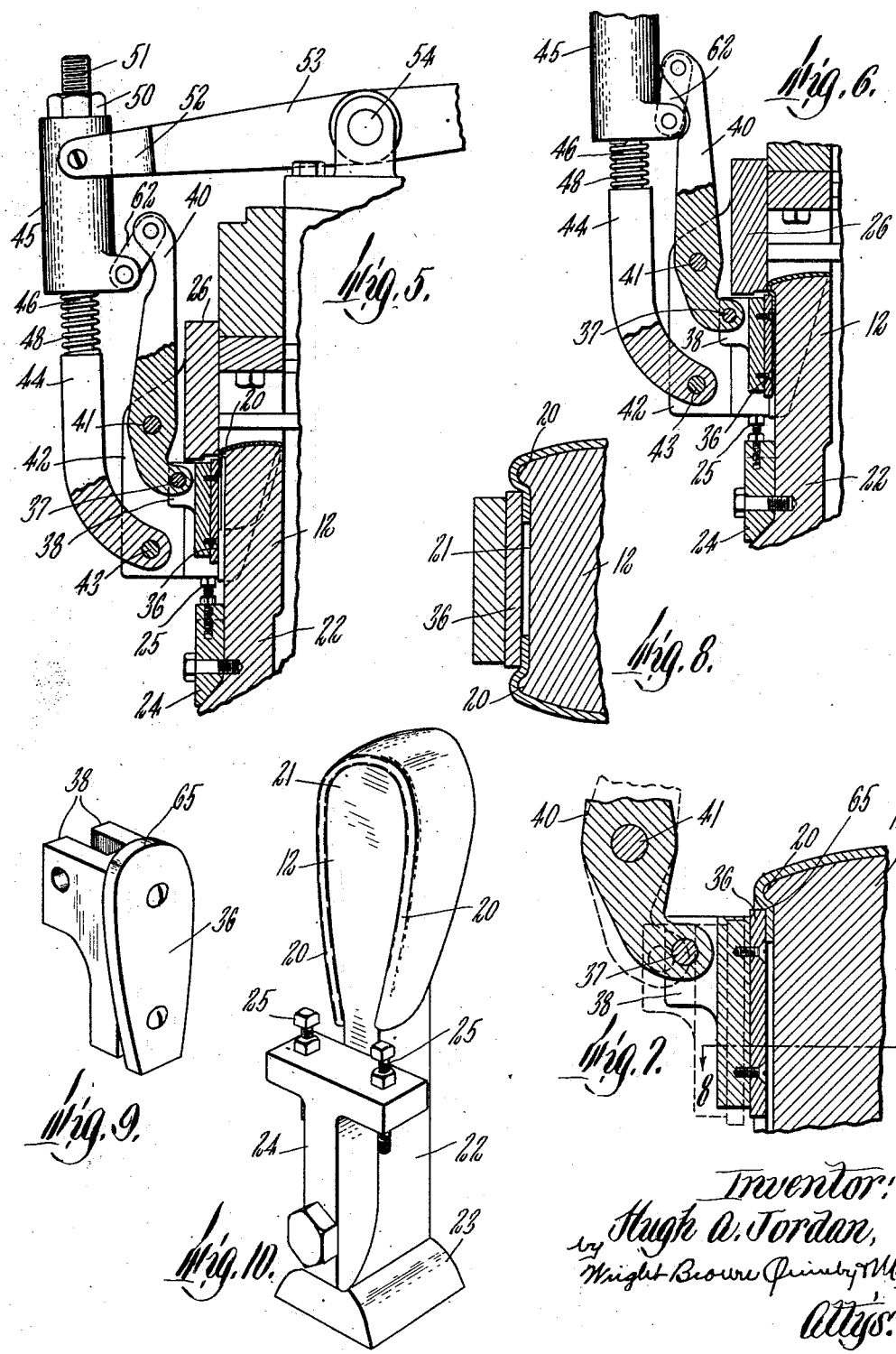

1,850,798

REISSUED

UNITED STATES PATENT OFFICE

HUGH A. JORDAN, OF NEWBURYPORT, MASSACHUSETTS, ASSIGNOR TO MILTON L. DODGE, OF NEWBURYPORT, MASSACHUSETTS

METHOD OF AND MACHINE FOR MOLDING COUNTERS

Application filed May 31, 1930. Serial No. 458,796.

This invention relates to methods of and machines for molding counter stiffeners for shoes, and more particularly for molding such a stiffener with a marginal downwardly extending bead on its sole-attaching flange, as disclosed in the Dodge Patent No. 1,430,158, September 26, 1922, for counter stiffener.

One of the objects of this invention is to provide a machine by which the molding of the flange with the bead may be effected in a single operation. To this end the flange is formed by a molding mechanism including a wiper which has a portion movable inwardly to press the marginal portion of the flange into a recess in a co-operating die block or form provided with a rib extending about the margin of the recess.

Further objects and advantages will appear from a more complete description of an embodiment of this invention illustrated in the accompanying drawings in which Figure 1 is a front elevation of the upper part of the machine with the parts in position to receive a counter blank to be molded.

Figure 2 is a section on line 2—2 of Figure 1.

Figure 3 is a side elevation to a smaller scale of the entire machine.

Figure 4 is a perspective of the molded counter.

Figures 5, 6 and 7 are fragmentary sections similar to a part of Figure 2, but showing the parts positioned during successive portions of the molding cycle.

Figure 8 is a section to a larger scale on line 8—8 of Figure 7.

Figures 9 and 10 are perspectives of certain molding forms.

While not limited thereto, this invention has been shown as applied to a counter-molding machine of the general type illustrated in the Ayer Patent No. 1,600,967, granted September 28, 1926, for counter-molding machine. As shown in Figure 3 herein, such a machine comprises a vertical standard 1 having at its lower rear portion a drive shaft 2 which may be actuated by means of a belt 3 passed about a pulley thereon, this drive shaft being provided with a pinion 5 meshing with a gear 6 on a shaft 7. This shaft 7 is provided with a crank 8 from which extends upwardly a pitman 9, which, as will later appear, is employed to actuate the counter flange wiper mechanism. On the forward face of the machine pedestal is positioned a molding form support 10. This, as shown, may be pivotally connected to the pedestal as by means of the links 11 in such a manner that a molding form or last 12 (shown detached in Figure 10) supported thereon may be moved upwardly between a pair of side forming members or molds 13, shown best in Figure 1. These molds 13 may be arranged to move inwardly so as to clamp a counter stiffener blank about the upper heel or rear end face of the form 12 and down about its sides. Spring plungers 14 provided with cam members 15 may be positioned to engage cam faces 16 on the lower ends of the molds 13 and force the lower ends of these molds inwardly to clamp the blank firmly about the form 12. This mechanism as thus broadly described is old in the art.

The form 12 is, however, specially constructed for the purposes of this invention. To this end it is provided with a marginal rib portion 20 which extends about its side and heel end faces and projects from the sole face of the form, defining inwardly thereof a recess 21.

As shown best in Figure 10, also, the mold member 12 is provided with a shank portion 22 provided with a base 23 and attachable to the forward face of the shank portion above the base is a T shaped block 24 having stop set screws 25 in its upper face. These stop set screws furnish means for limiting the downward motion of a wiper indicated generally at 26.

In machines of this type it is customary to first raise the member 10 carrying the form or last 12 so as to clamp the stiffener blank between the member 12 and the molds 13 with the marginal portion of the blank extending forwardly thereof, as shown at 30 in Figure 2. When in this position the wiper 26 shown herein is brought down across the sole end face of the form, thus to wipe the margin 30 across the sole face of the form 12 and over the bead 20, as shown in Figure 5. To this end the wiper 26 is supported between guides 35 (see Figure 1) which restricts its motion to movement in a plane parallel to the sole face of the form 12. This wiper member as shown carries a portion 36 which in addition to the motion with the main portion 26 may be given a further motion transversely of the wiper motion so as to press the inner margin of the counter flange into the recess 21. As shown in Figures 2, 5 and 6, this portion 36 is pivoted at 37 between spaced walls 38 to the lower end of a lever 40, which is fulcrumed at 41 between spaced walls 42 extending outwardly from the wiper 26. Between the walls 42 and adjacent to their lower ends is pivoted at 43 an arm 44, which is curved upwardly and has a block member 45 slidable on its upper reduced end 46. This block member 45 is shown as counterbored at 47 to form a housing for the upper end of a stiff coil spring 48, the lower end of which rests on a shoulder portion 49 on the arm 44. The block member 45 is held against detachment from the arm 44 as by means of a nut 50 threaded on the upper end 51 of this arm above the block 45.

In order to produce the wiping and retracting motion of the wiper 26, this block 45 is pivoted in a bifurcated end 52 of a lever 53, which is fulcrumed at 54 at the top of the machine standard and is connected for actuation by the pitman 9. As shown in Figure 3, this connection includes a link 55 pivoted thereto and slidable on the upper end of the pitman and bearing on a spring 56 surrounding this pitman and seated on a collar 57 secured thereto. This spring 56 is heavier than the spring 47 and comes into action only should an excessive resistance be encountered in the wiping movement of the wiper 26, whereupon it may yield to prevent breakage of the parts. Ordinarily it does not function.

The stops 25 are so set that when the wiper 26 is stopped thereby the portion 36 is opposite to the recess 21 in the form member 12. When the wiper 26 reaches this stopped position, the block 45 may be given a further downward motion against the resistance of the spring 48 and this further downward motion is availed of to move the portion 36 into the recess 21 of the form, thus to form the flange of the counter stiffener about the rib 20 and thus form a bead 60 mating the rib about the margin of the attaching flange, as is illustrated in Figure 4, and as shown in the Dodge patent hereinbefore mentioned. To this end the upper end of the lever 40 is pivotally connected by a link 62 to the block 45. The link and lever are so proportioned and fulcrumed that as the block 45 is depressed after the wiper 26 has reached its downward limit, the upper end of the lever 40 is pulled outwardly, as shown in Figures 5 and 6, thus to project the portion 36 inwardly of the wiping face of the wiper 26 so as to carry the inner edge portion of the counter flange into the recess 21. In Figure 5 the portion 36 is shown as about to push the counter stiffener margin into the recess, while in Figure 6 this movement has been completed. As shown also in Figure 7, the fulcrum 41 is so positioned that this movement of the lever 40 acts to move the portion 36 upwardly toward the heel end of the form 12 so that its upper relatively sharp edge or corner portion 65 presses the counter flange firmly against the inner face of the rib 20, thus to cause the bead 60 to become sharply defined so that it may better serve its intended purpose. In dotted lines in Figure 7 the position of the portion 36 is shown prior to reaching its final position, while in full lines it is shown in final position.

From the foregoing description of an embodiment of this invention, it should be evident to those skilled in the art that various changes and modifications may be made without departing from the spirit or scope of this invention as defined by the appended claims.

I claim:

1. Counter molding mechanism including a form for supporting a counter blank and having a marginal rib on one face defining a recess, and a wiper movable across said face to form a sole-attaching flange on said blank, said wiper having a portion movable into said recess while the remainder of said wiper is stationary to thereby mold a bead on said flange mating the rib on said form.

2. Counter molding mechanism including a form for supporting a counter blank and having a marginal rib on one face defining a recess, and a wiper movable across said face to form a sole-attaching flange on said blank, said wiper having a portion shaped to enter said recess, means for moving said wiper to form said flange, and connections from said moving means to said portion for positively pressing the margin of said flange into said recess to thereby mold a bead on said flange mating the rib on said form.

3. A machine of the class described comprising a heel-shaped form having a marginal rib on its sole face defining a recess, means for conforming a counter blank to the rear and side faces of said form, a wiper, means for supporting said wiper for movement across the sole face of said form to wipe over the margin of said blank to form a sole-attaching flange, means for moving said wiper, said wiper having a portion shaped to enter said recess, means for limiting the wiping movement of said wiper to a position where said portion is opposite to said recess, and connections from said portion to said moving means for causing further action of said moving means after the motion of said wiper is stopped to move said portion into said recess to thereby form a marginal rib on said flange.

4. In combination, means for bending the marginal portion of a counter blank to form a sole-attaching flange, an actuator for said means, and means positively operated by said actuator after said portion has been bent for forming a marginal bead on said flange portion.

5. In combination, a heel-shaped form having a marginal rib on its sole face defining a recess, means for clamping a counter blank about the rear and side portions of said form with a margin extending beyond said face, a wiper, guides for supporting said wiper for movement across said face to bend over the margin of said blank at said bead to form a sole-attaching flange, said wiper having a portion shaped to enter said recess, means for stopping the movement of said wiper with said portion opposite to said recess, a member movable to slide said wiper, a heavy spring interposed between said member and wiper to permit further movement of said member after movement of said wiper has been stopped, and connections between said member and portion for causing continued movement of said member after said wiper movement is stopped to move said portion into said recess to thereby form a marginal rib on said attaching flange.

6. In combination, a heel-shaped form having a marginal rib on its sole face defining a recess, means for clamping a counter blank about the rear and side faces of said form with a margin extending beyond said face, a wiper, guides for supporting said wiper for movement across said face to bend over the margin of said blank at said bead to form a sole-attaching flange, said wiper having a portion shaped to enter said recess, means for stopping the movement of said wiper with said portion opposite to said recess, a member movable to slide said wiper, a heavy spring interposed between said member and wiper to permit further movement of said member after movement of said wiper has been stopped, and connections between said member and portion for causing continued movement of said member after said wiper movement is stopped to move said portion into said recess to thereby form a marginal rib on said attaching flange, said connections including elements for moving said portion toward the heel end of said form while it is moving into said recess.

7. A machine of the class described, comprising a heel-shaped form having a marginal rib on its sole face defining a recess, means for clamping a counter blank about said form with a margin extending beyond said sole face, a wiper, means for guiding said wiper to move across said sole face and wipe said blank margin thereon to produce a sole-attaching flange, said wiper having a portion shaped to enter said recess, means for stopping the wiping motion of said wiper when said portion is presented opposite to said recess, means for actuating said wiper including an arm pivoted thereto, a member slidable on said arm, a spring interposed between said member and arm for compression by further movement of said member after said wiper motion has been stopped, a lever pivoted to said portion and fulcrumed on said wiper adjacent thereto, a link connecting said lever to said member, said link and lever being arranged to cause such further movement of said member to move said portion into said recess and toward the heel end of said form, and means for moving said member.

8. The method of molding a counter flange having a marginal bead thereon, which comprises forming said flange between cooperating forming members, one of said members having a rib for forming the inner face of said bead and a recess inwardly of said rib and the other having a portion projectable into said recess, and moving said ribbed form and said portion relatively in said recess relatively parallel to said flange in a direction to cause said portion to press the counter flange against the inner face of said rib.

In testimony whereof I have affixed my signature.

HUGH A. JORDAN.